Feb. 25, 1941.    E. D. KASSELL ET AL    2,233,015
TENSION WINDING CONTROL
Filed Oct. 11, 1939    5 Sheets-Sheet 1

INVENTOR
E. D. Kassell
J. H. H. Walton
By Watson, Cole, Grindle & Watson
ATTORNEY

Feb. 25, 1941. E. D. KASSELL ET AL 2,233,015
TENSION WINDING CONTROL
Filed Oct. 11, 1939 5 Sheets-Sheet 4

Feb. 25, 1941.  E. D. KASSELL ET AL  2,233,015
TENSION WINDING CONTROL
Filed Oct. 11, 1939   5 Sheets-Sheet 5

INVENTOR
E. D. Kassell
J. H. H. Walton
BY
Watson, Cole, Grindle & Watson
ATTORNEY Patented Feb. 25, 1941

2,233,015

UNITED STATES PATENT OFFICE 2,233,015

TENSION WINDING CONTROL

Edward Douglas Kassell and James William Wilkinson Walton, London, England, assignors to J. H. Holmes & Company Limited, Hebburn-on-Tyne, England, a company of Great Britain Application October 11, 1939, Serial No. 299,024
In Great Britain September 29, 1938

13 Claims. (Cl. 242—75)

This invention relates to the control of moving webs, such for example as paper and other strip material, or cords, wires and the like.

According to known arrangements the material in passing from a supply station to a take-up station bears against a jockey pulley or roller which, when displaced from a normal or central positon due to alteration of the tension of the material, operates a moving contact associated with fixed contacts situated at a predetermined distance from the moving contact, thereby closing a control circuit to initiate a correction in the tension of the material. Such arrangements are, however, liable to produce over-correction, with a consequent tendency to hunting of the conrol and the main object of the present invention is to provide an improved method and means of control which will not only reduce hunting to a minimum but will at the same time retain a high degree of sensitivity, accuracy and speed of response.

To this end, according to the present invention, when the speed and/or tension of the material deviates from a given value, corrective electrical impulses are successively transmitted at a predetermined periodicity to exert a corrective influence on the movement of the material, the duration of each impulse being in accordance with the amount of the said deviation.

The corrective impulses may be employed to control a device which, in turn, controls a supply of power for varying the rate at which the material is taken up and/or supplied, or the corrective impulses may themselves constitute variations in the said power supply.

The follower is preferably constituted by a movable contact or brush which cooperates with a rotary distributor having two contact segments connected to two circuits for controlling respectively the increase and decrease in the rate at which the material is taken up and/or supplied. The distributor segments may be so arranged with respect to the movable contact or brush that as the latter moves in one direction or the other away from a normal or central position the brush makes contact with the appropriate segment at a predetermined periodicity and the duration of each contact period increases or decreases as the brush moves away from or towards the said normal position. The contact segments may be spaced apart on the distributor in a direction transverse to the axis of rotation thereof, or these segments may be spaced apart in a direction parallel to the said axis.

In another arrangement the follower controls a make-and-break device whereby electrical impulses are initiated and transmitted to an electric circuit for regulating the speed and/or tension of the material. For example, the impulses initiated by the make-and-break device may effect grid control of an electronic amplifier whose output is utilised to control the speed and/or tension of the material. The electronic amplifier delivers impulses whose duration varies in accordance with the position of the follower, the said output impulses being preferably themselves utilised for the load applied to the material.

The invention may be carried into practice in various ways but some practical arrangements particularly suitable for controlling the tension of the paper web fed to a rotary printing press and each according to the invention are shown diagrammatically and by way of example in the accompanying drawings, in which Figure 1 shows one arrangement, Figures 2 and 3 respectively show the distributor of Figure 1 in side elevation and end elevation.

Figure 1:
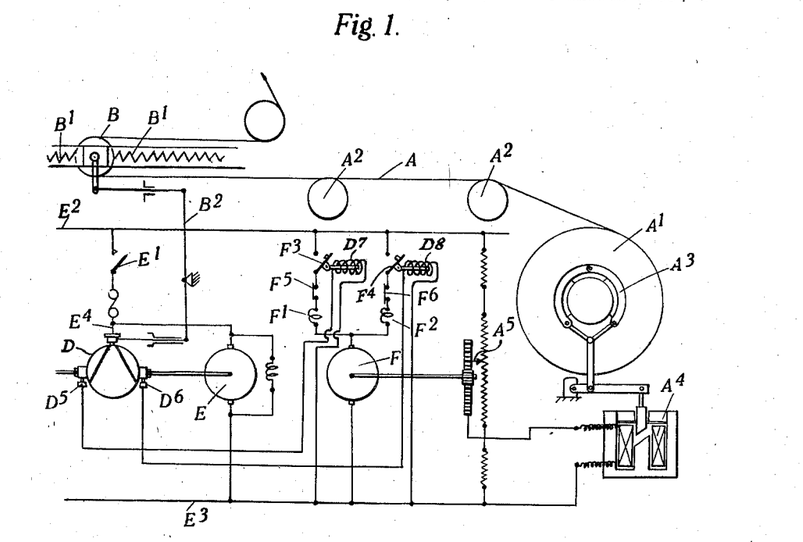
Figure 2:
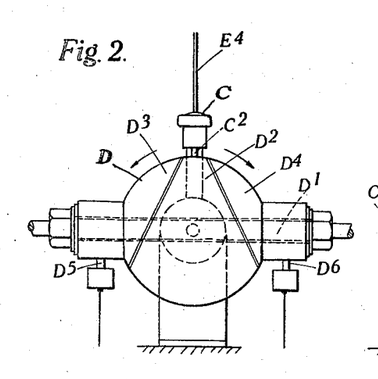
Figure 3:
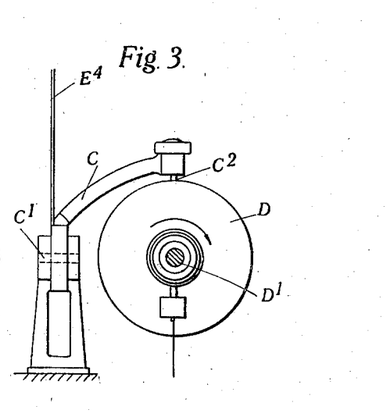

In the construction shown in Figures 1 to 3, a paper web A passes from a supply roll $A^1$ over guide roller $A^2$ and round a jockey roller B to a printing press. The jockey roller B is loaded by springs $B^1$ so that while the tension of the web A is at a predetermined value the jockey roller B remains substantially stationary in a normal or central position shown. The jockey roller B is connected by mechanism indicated at $B^2$ to an arm C mounted on a horizontal pivot $C^1$ on a fixed part. The arm C carries a brush $C^2$ which cooperates with a spherical distributor D mounted on a shaft $D^1$ driven by an impulse timing motor E. The surface of the distributor D has a central metallic strip $D^2$ insulated on each side from two contact strips $D^3$ $D^4$. Alternatively, the strip $D^2$ may be of insulating material. The central strip $D^2$ widens from a minimum on one side of the axis of rotation of the shaft $D^1$ to a maximum at a diametrically opposite part and then again decreases in width down to the said minimum, the peripheral dimension of each contact segment in any plane at right angles to the axis of rotation thus increasing with the distance of said plane from the central plane transverse to the axis of rotation and passing only through the central strip. The brush $C^2$ bears on the periphery of the distributor and with the jockey roller B shown in the central position $B^1$ the brush $C^2$ lies in the central position shown in Figure 2, that is to say so as to make contact only with the central strip $D^2$.

The pilot motor E which is operated at constant speed is connected through a main control switch $E^1$ across power supply mains $E^2$ $E^3$, the brush $C^2$ being connected by a lead $E^4$ through the main switch $E^1$ to the main $E^2$ whilst two collecting brushes $D^5$ $D^6$ bearing on the two segments $D^3$ $D^4$ of the distributor D are connected through a tension reduction control contactor coil $D^7$ and a tension increase control contactor coil $D^8$ respectively to the supply main $E^3$.

The reel carrying the supply roll $A^1$ is furnished with a brake $A^3$ operated by a solenoid $A^4$ which is connected across the supply circuit $E^2$ $E^3$ through a rheostat $A^5$ controlled by a brake regulating motor F. The brake motor F has forward and reverse field windings $F^1$ $F^2$ each arranged in series between the main supply circuit $E^2$ $E^3$ and the motor F, with the two field windings $F^1$ $F^2$ in parallel with each other. The contactor coil $D^7$ controls contacts $F^3$ arranged in series with the field winding $F^1$ whilst the contactor coil $D^8$ controls contacts $F^4$ arranged in series with the field winding $F^2$, limit switches $F^5$ $F^6$ being provided in series with the field windings $F^1$ $F^2$ and the contacts $F^3$ $F^4$. Assuming that the main switch $E^1$ is closed and the press is in operation with the tension of the web A remaining substantially constant at the desired value, the jockey roller B will remain substantially stationary in its normal or central position. Since the pilot motor E is in rotation, the follower brush $C^2$ will trace a substantially circular path around the central strip $D^2$ of the distributor D. Both the coils $D^7$ $D^8$ will therefore remain inoperative and the contacts $F^3$ $F^4$ will remain open so that the brake control motor F will not be in operation. The rheostat $A^5$ will now be in a position, for example a central position, which will result in the bung brake $A^4$ of the supply reel applying the drag necessary to maintain the said web tension. If now the web tension decreases for any reason, the jockey roller B will be displaced from the normal position and will thus turn the arm C carrying the follower brush $C^2$ through a corresponding angular distance, thus moving the brush $C^2$ on to the contact segment $D^4$. The coil $D^8$ will thus be periodically energised and the contacts $F^4$ periodically closed by successive electrical impulses supplied to the tension increase coil $D^8$ at a periodicity corresponding to the speed of the impulse timing pilot motor E, each impulse having a duration which is in accordance with the degree of movement of the brush $C^2$ from its central position. The brake motor F will thus be driven forwards and will reduce the effective resistance of the rheostat $A^5$ in accordance with the displacement of the jockey roller B, thereby increasing the current supplied to the solenoid $A^4$ and increasing the drag applied to the web A. The resulting increase in the tension of the web A will cause the jockey roller B to be returned towards the central position which will in turn cause the brush $C^2$ to be swung back towards its central position on the distributor D. The duration of each impulse transmitted through the tension increase coil $D^8$ to the brake motor F will thus decrease and the impulses will finally cease when the brush $C^2$ has been restored to its central position between the two contact segments on the distributor D. The rheostat $A^5$ will thus be adjusted to a new value at which the drag applied to the reel carrying the supply roll $A^1$ is increased with consequent restoration of the web tension.

Since the duration of each corrective impulse is in accordance with the amount of deviation of the jockey roller from its normal position (apart from the comparatively slight latitude of initial movement permitted by the minimum peripheral width of the strip $D^2$), the rate at which correction is effected will correspond to the amount of deviation of the web tension from the desired value and this, in combination with the fact that the corrections are made through the agency of current of an impulse nature, will result in hunting being substantially eliminated or reduced to a minimum without sacrificing accuracy or sensitivity and at the same time enabling a high speed of response to be made.

The operation of the control system when the web tension increases above the desired value is the reverse of that described above. Thus, when the tension increases above the said value, the resulting movement of the jockey roller B will swing the follower brush $C^2$ over the distributor D into contact with the segment $D^3$ corresponding to the tension decrease control coil $D^7$ which is thus periodically closed with the duration of each period increasing with the displacement of the follower brush from its normal position. The resulting periodic closing of the contacts $F^3$ and the impulses thus transmitted to the brake motor F will causes this to operate in the reverse direction, thereby adjusting the rheostat $A^5$ so as to increase the effective resistance in series with the solenoid $A^4$. The drag applied to the web A is thus decreased. As the web tension is decreased towards the desired value, the jockey roller B and therefore the brush $C^2$ return towards their normal positions and the duration of each impulse transmitted to the brake motor F is reduced until finally the web tension has been restored to the desired value, the impulses then ceasing so that the brake motor F ceases to operate.

In order to limit the range of adjustment either towards increase or decrease of the web tension, means are provided whereby the two limit switches $F^5$ $F^6$ are automatically controlled so that, should the brake motor F operate to adjust the rheostat $A^5$ beyond a given value for increasing the brake force, the limit switch $F^6$ in series with the forward field winding $F^2$ is automatically opened, whereas should the brake motor operate to adjust the rheostat beyond a given value to reduce the brake force, the limit switch $F^5$ in series with the reverse field winding $F^1$ will be automatically opened.

Figure 4:
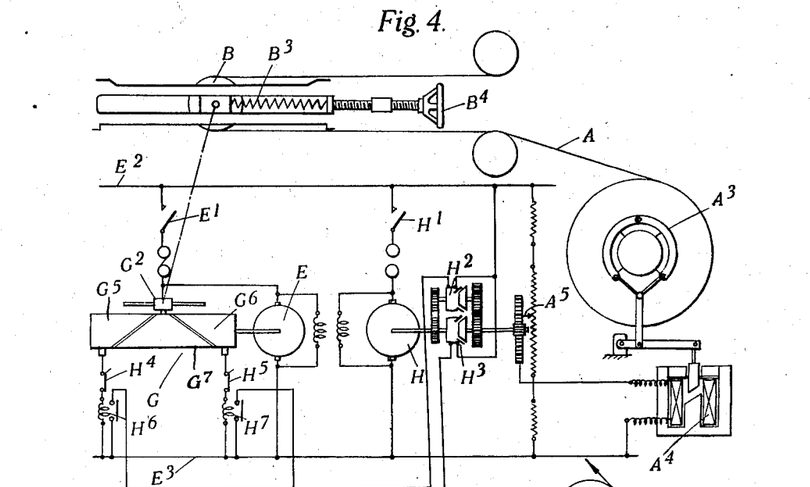
Figure 4 is a modified arrangement.
Figure 5:
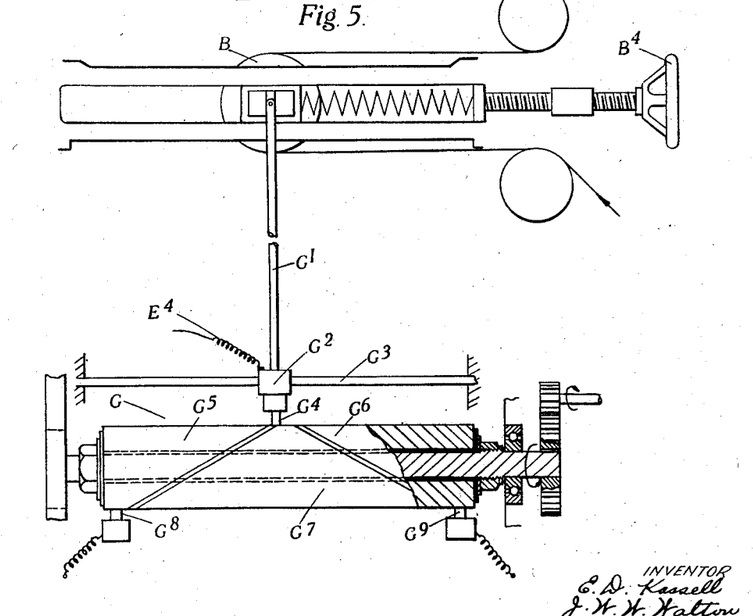
Figure 5 shows the distributor of Figure 4 on an enlarged scale.

Instead of employing a reversible pilot motor for operating a brake control rheostat as above described, the rheostat $A^5$ may be operated by a continuously operating pilot motor. One such arrangement is shown in Figures 4 and 5, in which the jockey roller B, which is loaded by a spring $B^3$ whose tension can be adjusted as desired by means of a hand wheel $B^4$, is connected as shown at $G^1$ in Figure 5 to a block $G^2$ slidable along a guide rod $G^3$ and carrying a follower brush $G^4$. As in the arrangement shown in Figure 1, the follower brush is connected through a lead $E^4$ and main control switch $E^1$ to a main supply conductor $E^2$, the pilot motor E for driving the distributor G being arranged as above described. The distributor G instead of being spherical is cylindrical and provided with two contact segments $G^5$ $G^6$ insulated from each other by a central strip $G^7$. Alternatively, the strip $G^7$ may be of conducting material and insulated from the two contact segments $G^5$ $G^6$. Each of the segments $G^5$ $G^6$ $G^7$ is so formed that its circumferential dimension increases from the inner end of the segment towards the outer end thereof. To this end each segment $G^5$ $G^6$ is generally triangular or D-shaped in development with the base of the triangle or the straight limb of the D lying at the corresponding outer end of the cylindrical distributor G.

The brake control motor H is connected across the main supply circuit $E^2$ $E^3$ through a switch $H^1$ and is connected through either of two alternative electromagnetic clutches $H^2$ $H^3$ to the rheostat $A^5$. Brushes $G^8$ $G^9$ are connected through limit control switches $H^4$ $H^5$ and coils $H^6$ $H^7$ to the supply conductor $E^3$, the coil $H^6$ controlling the energisation of the clutch $H^2$ whilst the contactor coil $H^7$ controls the energisation of the clutch $H^3$.

In the event of the tension of the web A decreasing below the desired value, the jockey roller B will move the brush $G^4$ into contact with the segment $G^5$. The coil $H^6$ is thus periodically energised and the clutch $H^2$ periodically rendered operative, the duration of each energisation period increasing as the brush $G^4$ moves further from the normal or central position and over the segment $G^5$. Each time the clutch $H^2$ is engaged, the rheostat $A^5$ is operated so as to reduce the effective value of the resistance of the rheostat $A^5$, thus increasing the current applied to the solenoid $A^4$ and increasing the drag applied to the web A. In the event of the tension of the web A increasing, the coil $H^7$ is periodically energised and the clutch $H^3$ periodically rendered operative so that the effective resistance of the rheostat $A^5$ is increased and the drag applied to the web A is decreased.

The tension can be adjusted as desired within the effective range of the brake and brake control rheostat $A^5$ by adjusting the hand wheel $B^4$ of the spring $B^3$ loading the jockey roller B.

Figure 6:
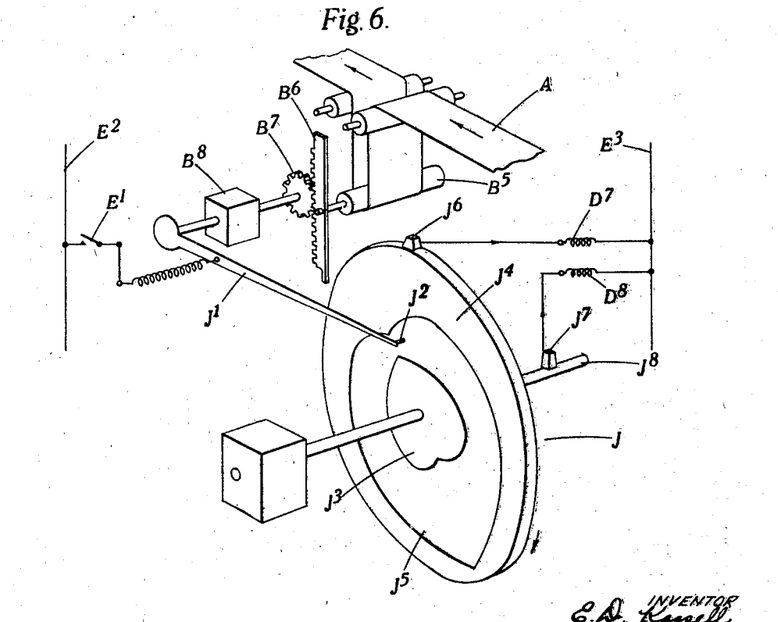
Figure 6 illustrates in perspective another form of distributor which may be employed.

Figure 6 illustrates a modified form of distributor which may be employed. In this arrangement the jockey roller $B^5$ is connected to a rack $B^6$ which engages a pinion $B^7$ at one end of a reduction gear $B^8$ the output end of which is connected to a follower arm $J^1$ carrying a brush $J^2$. The brush $J^2$ is connected through the arm $J^1$ and through the main control switch $E^1$ to the main supply conductor $E^2$. The brush $J^2$ cooperates with contact segments arranged on one face of a disc-like distributor J comprising two contact segments $J^3$ $J^4$ lying one within the other and insulating material $J^5$ between them. Alternatively, the intermediate area $J^5$ of the disc may be formed of conducting material insulated from the contact segments $J^3$ $J^4$. The outer segment $J^4$ is in the form of a ring having a maximum radial width at one radius and decreasing in width on both sides of the said radius until the width is at a minimum at the opposite radius, the outer segment thus enclosing a substantially heart-shaped space. The inner segment $J^3$ is also approximately heart-shaped but is inverted with respect to the heart-shaped intermediate area $J^5$. A brush $J^6$ bears on the periphery of the distributor J so as to be maintained in contact with the outer segment $J^4$, the brush $J^6$ being connected through the contactor coil $D^7$ to the main conductor $E^3$. A second brush $J^7$ establishes connection between the contactor coil $D^8$ and the contact segment $J^3$ through the shaft $J^8$ of the distributor which is driven by the pilot motor E, as described with reference to Figure 1.

When the brush $J^2$ is in its central position, it contacts only with the insulation or insulated metal strip $J^5$, but when the brush $J^2$ is displaced from the said position away from or towards the axis of rotation of the distributor J, the brush periodically contacts with the outer segment $J^4$ or the inner segment $J^3$ to transmit impulses the duration of each of which increases as the follower moves away from the normal position shown in Figure 6. The jockey roller $B^5$ is loaded by a spring or springs which tend to maintain it in the normal position.

It will be understood that the periodicity of the impulses will depend upon the speed of rotation of the distributor whilst the duration of each impulse for any given position of the follower brush will depend upon the shaping of the contact segments of the distributor so that the required control may be obtained by suitable formation of the said segments. It should however be understood that the speed of rotation of the distributor, and hence the periodicity of the impulses, need not be constant but may vary without departing from the spirit of the invention. For example, with particular types of gear it may arise that the sensitivity of the response of the apparatus will be a maximum at a certain speed of rotation of the distributor, and in these circumstances it would be advantageous to include a variable speed pilot motor in order exactly to obtain the said speed. Moreover, it may prove desirable to dispense with the pilot motor and derive the distributor drive from some external source which does not necessarily operate at constant speed. Whether the speed of the distributor is constant or variable, however, the sensitivity and speed of response of the control system are both high since the contacts can be arranged to supply impulses for very small deflections of the jockey roller without any appreciable tendency to hunting.

When a rotary distributor is employed as above described the impulses (whose durations vary in accordance with the deviation of the speed and/or tension of the material) are employed solely for control purposes, that is to say such impulses do not themselves constitute part of the braking load. Moreover, these impulses are only transmitted when correction is required, i. e. when the said deviation takes place, and cease when the speed and/or tension has been restored to the desired normal value. The impulses are transmitted in opposite senses on either side of a centre respectively for reduction and increase of the speed and/or tension, precise adjustment of which is available when the jockey roller is spring-loaded.

Figures 7, 8:
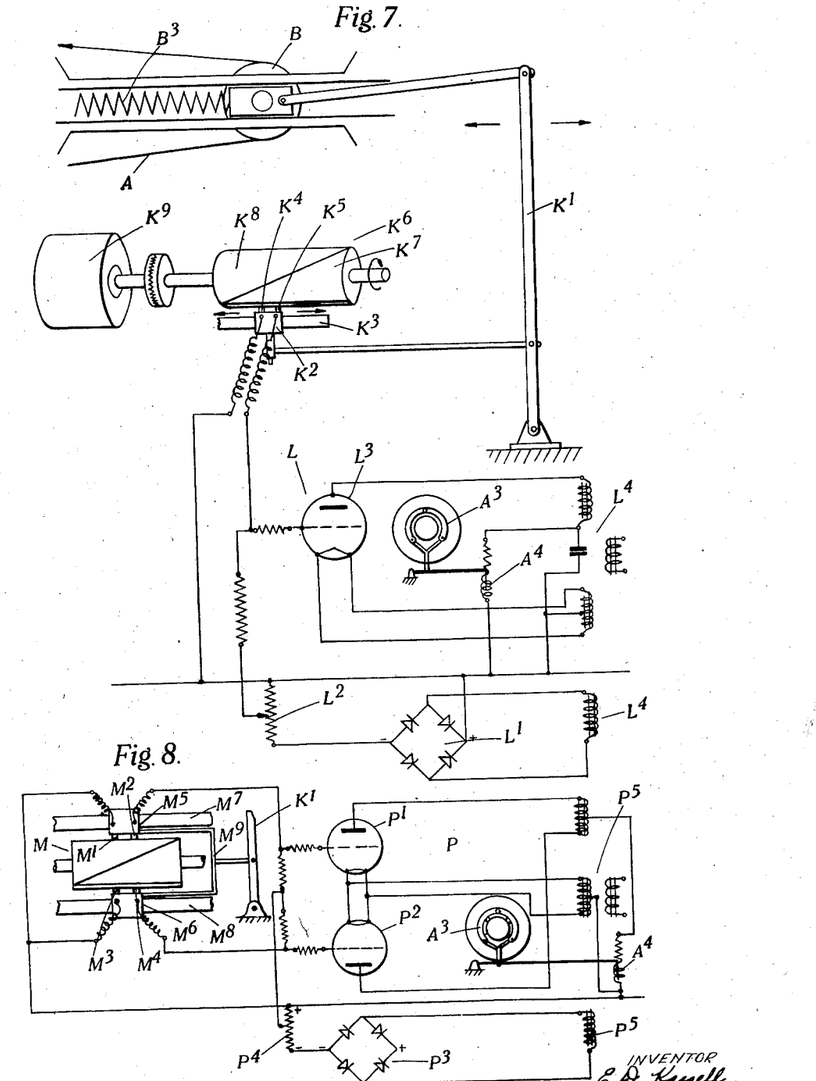
Figures 7–11 show five further arrangements each of which incorporates an electronic amplifier.

In the arrangement shown in Figure 7, the jockey roller B loaded by the spring $B^3$ is connected through lever and link mechanism $K^1$ to a block $K^2$ slidable along a guide rod $K^3$. The block $K^2$ carries two contacts $K^4$ $K^5$ which are insulated from each other and bear on the surface of a rotary make-and-break device in the form of a drum $K^6$ having a contact segment $K^7$ the remainder of the periphery $K^8$ of the drum, which is driven by a synchronous motor $K^9$, being of insulating material. The contacts $K^4$, $K^5$ are connected to an electronic amplifier generally indicated at L which controls the load on the moving material, that is to say, on the web A in the arrangement shown, by means of the electrically operated brake $A^3$. The contact segment $K^7$ is so shaped that the point of the half cycle at which a restraining negative bias supplied by a rectifier $L^1$ through an adjustable restraining resistance $L^2$ to the grid of the amplifier valve $L^3$ is removed by short-circuiting of the pair of contacts $K^4$ $K^5$, is determined by the position of these contacts with respect to the drum $K^6$, that is to say in accordance with the position of the jockey roller B. This constitutes grid control of the valve $L^3$ and determines the average value of the current that will pass through the valve and therefore the load, that is to say the braking current supplied to the solenoid $A^4$, on the moving web A during the conducting half cycle. Regulation of the value of the tension and/or speed to be maintained can be effected by varying the voltage applied through the supply transformer $L^4$ or to any one or more of the electric circuits involved, or by controlling the loading of the jockey roller B.

Figure 8 shows a modified arrangement in which two pairs of contacts $M^1$ $M^2$ and $M^3$ $M^4$ carried on blocks $M^5$ and $M^6$ are arranged 180° apart around the make-and-break drum M, similar to the drum $K^6$ described with reference to Figure 7. The blocks $M^5$ $M^6$ are adjustable along guide rods $M^7$ $M^8$ by means of a frame $M^9$ connected to the jockey roller by the lever and link mechanism $K^1$. The two pairs of contacts $M^1$ $M^2$ and $M^3$ $M^4$ are connected to the grid circuits of two plates $P^1$ $P^2$ of a full-wave single-phase amplifier P. The point of the half cycle at which a restraining negative bias supplied by the rectifier $P^3$ through an adjustable restraining resistance $P^4$ to the grid of each amplifier valve $P^1$ $P^2$ is removed by the short-circuiting of the associated pair of contacts $M^1$ $M^2$ or $M^3$ $M^4$ is determined by the position of these contacts with respect to the drum M, that is to say, the position of the jockey roller. The average value of the current that will pass through each valve and therefore the braking current supplied to the solenoid $A^4$ of the brake $A^3$ is thus determined. Here again regulation of the value of the tension and/or speed to be maintained can be effected by varying the voltage applied by the supply transformer $P^5$.

It will be understood that, if desired, three pairs of contacts, such as the contacts $M^1$ $M^2$, $M^3$ $M^4$, may be spaced apart by 120° around the drum and used in conjunction with a three-phase amplifier giving half-wave rectification, or six pairs of contacts may be spaced at 60° apart and employed in conjunction with a three-phase full-wave rectifier.

Figure 9:
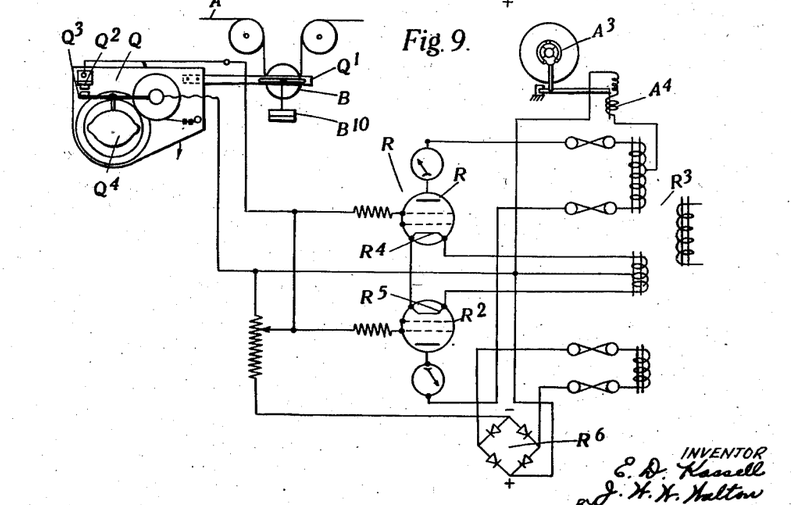

In the modified arrangement shown in Figure 9, the jockey roller B loaded by a weight $B^{10}$ acts through a lever $Q^1$ on a carrier Q supporting fixed and moving contacts $Q^2$ $Q^3$ connected respectively to the grid circuits of two gas-discharge valves $R^1$ $R^2$ of a valve amplifier R. Displacement of the jockey roller B thus angularly adjusts the carrier Q about an axis coincident with the axis of rotation of a synchronously driven make-and-break cam $Q^4$ which closes and opens the contacts $Q^2$ $Q^3$ at a predetermined periodicity. The valve amplifier R is supplied from a main transformer $R^3$ whose primary is energized from alternating current mains whilst its secondary supplies not only the anode current but also the valve heaters $R^4$ $R^5$ and a grid bias rectifier $R^6$. Thus, when the speed and/or tension of the material, that is to say the web A in the arrangement shown, deviates from a desired normal value, the carrier Q is rocked in one direction or the other so that the point in the half cycle at which the contacts $Q^2$ $Q^3$ close and remove the negative bias supplied to the grids of the valves $R^1$ $R^2$ will vary in accordance with the position of the jockey roller B. Each rectified half cycle can be regarded as an impulse, the duration of which is governed by the position of the jockey roller B. Only a momentary removal of the restraining bias is necessary since each valve $R^1$ $R^2$ will continue to discharge for the remainder of the half-cycle once the discharge has been started. The tension and/or speed of the moving material A will be maintained at a value corresponding to half the weight of the jockey roller B and its loading $B^{10}$.

Figure 10:
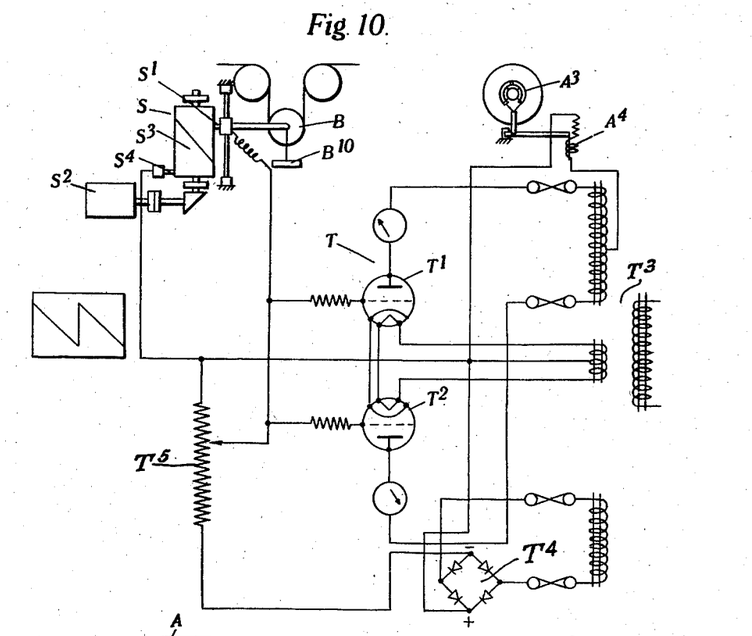

In the modified arrangement shown in Figure 10, a brush $S^1$ is moved by the gravity-loaded jockey roller B along a make-and-break drum S driven by a pilot motor $S^2$ and having a contact segment $S^3$. The movable brush $S^1$ and a fixed brush $S^4$ which is permanently in contact with the segment $S^3$ are connected to the grid circuit of an electronic amplifier T having "hard" thermionic valves $T^1$ $T^2$ whose output is employed to energise the solenoid $A^4$ for the brake $A^3$. The anode and valve heater of the amplifier T are supplied from a transformer $T^3$ which also supplies the grid bias rectifier $T^4$ and resistance $T^5$. The grid control is similar to that above described but the instantaneous anode current is a function of the instantaneous applied grid and anode voltages.

Though in some of the arrangements described gravity-loaded jockey rollers have been employed since this permits exact control of the speed and/or tension of the material, it may be more convenient to employ spring-loading in spite of the fact that this will give only approximate determination of the speed and/or tension.

Figure 11:
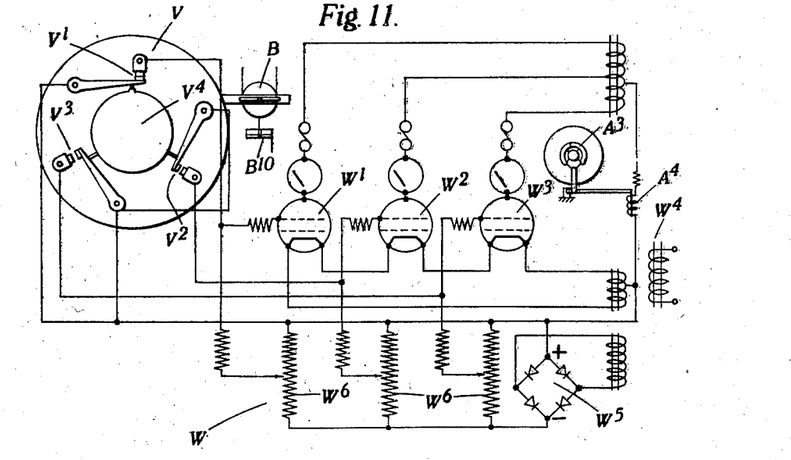

In the arrangement shown in Figure 11, the jockey roller B controls the angular position of adjustment of a rotary member V which carries three pairs of cooperating contacts $V^1$ $V^2$ and $V^3$ 120° apart, the rotary member V being coaxial with a synchronously driven make-and-break cam $V^4$. The three pairs of contacts $V^1$ $V^2$ $V^3$ are respectively connected to the grids of three mercury vapour valves $W^1$ $W^2$ and $W^3$, incorporated in a valve amplifier W, the anode current for the valves $W^1$ $W^2$ $W^3$ being supplied from a transformer $W^4$ connected to a three-phase alternating current supply, whilst the restraining negative grid bias is supplied from a rectifier $W^5$ to adjustable grid bias restraining resistances $W^6$. This arrangement gives three-phase half-wave rectification, the output from the valves $W^1$ $W^2$ $W^3$ being applied as the load, that is to say, for energising the solenoid $A^4$ of the brake $A^3$.

As opposed to the arrangements first described in which the impulses initiated by the distributor are not themselves employed as the braking load, the arrangements which utilise valve amplifiers provide two sets of impulses, namely those transmitted by the contact make-and-break to the grids of the valve or valves of the amplifier and which act as the controlling influence only, and those actually applied as the load, e. g. for energisation of the brake coil. The load current itself therefore consists of a series of unidirectional impulses (at line frequency in the case of full-wave rectification) the duration of each impulse, and therefore the effective brake current, being dependent upon the position of the jockey roller. Both the grid control and the load impulses continue all the time the apparatus is in operation, the load or anode impulses increasing or decreasing from a given value so that these impulses are, in effect, analogous to the impulses obtained with a centre-zero distributor as described above. It will be understood that though the load or anode impulses will vary in duration in accordance with the deviation of the jockey roller from a normal position, the grid control impulses need not also vary in accordance with the said deviation.

If an electronic amplifier having "hard" valves is employed, as opposed to valves of the mercury vapour or gas discharge type, the average anode current per cycle would depend upon the value of grid bias applied at each instant throughout the half cycle. Thus, when a control of the make-and-break type is utilised the grid control impulses should vary in duration with the deviation of the jockey roller referred to. When employing a valve amplifier having valves of the mercury vapour tube type, however, once the restraining bias has been reduced below the ignition value, the discharge will take place for the remainder of the half cycle irrespective of the bias applied to the grid subsequent to the initiation of the discharge. Hence, to obtain control of the type required it is only necessary to remove the restraining bias from the grid at the required point in the cycle by means, say, of a neutralising impulse of very short duration.

It will be appreciated that the control according to the invention does not merely compensate for unexpected variations in tension but also adjusts the tension as the diameter of a supply or take-up roll decreases or increases. For example, when the invention is applied to wire-reeling apparatus the torque of the driving motor would be automatically increased with increase of the diameter of the roll. Similarly when applied to a printing press, the retardation applied to the web supply roll would be automatically reduced with decrease of the roll diameter.

What we claim as our invention and desire to secure by Letters Patent is:

1. In apparatus for controlling the winding of webs, cords, wires and like materials, in combination, a source of current supply, tension regulating means which regulates the rate at which the material is taken up relatively to the rate at which it is supplied, a follower, means whereby the follower is displaced in accordance with variations in the tension of the material, a rotary contact device, driving means whereby the rotary contact device is driven at a predetermined speed, an electric control circuit which controls the tension regulating means and whose effective energisation from said current source is interrupted by the rotary contact device whereby corrective electrical impulses are applied at a predetermined periodicity to the control circuit for the control of the tension regulating means, and means whereby the time characteristics of the impulses are controlled by the follower in accordance with the amount of the said displacement of the follower.

2. In apparatus for controlling the winding of webs, cords, wires and like materials, the combination of a follower displaced in accordance with variations in the tension of the material, a source of current supply, two electric control circuits connected to said source, means whereby the control circuits respectively regulate the increase and decrease in the rate at which the material is taken up relatively to the rate of supply, a rotary distributor, means whereby the distributor is driven at a predetermined speed, two contact segments on the distributor, means connecting the two segments to the two control circuits respectively, a movable contact brush connected to said source, and means whereby the contact brush is moved over the distributor by the follower to engage with one or other of the contact segments in accordance with the direction of displacement of the follower from a normal or central position and thereby intermittently to energise one or other of the two control circuits, the duration of each electrical impulse applied to the control circuit being in accordance with the amount of the said displacement.

3. In apparatus for controlling the winding of webs, cords, wires and like materials, the combination of a follower displaced in accordance with variations in the tension of the material, a source of current supply, two electric control circuits connected to said supply source, means whereby the control circuits respectively regulate the increase and decrease in the rate at which the material is taken up relatively to the rate of supply, a rotary distributor, means whereby the distributor is driven at a predetermined speed, two contact segments spaced apart on the distributor in a direction transverse to the axis of rotation thereof, means connecting the two segments to the two control circuits respectively, a movable contact brush connected to the source of current supply, and means whereby the contact brush is moved over the distributor by the follower, the contact brush as it moves from a normal position on the distributor making contact with the appropriate segment at a predetermined periodicity, the duration of each contact period increasing as the brush moves further away from the said normal position.

4. In apparatus for controlling the winding of webs, cords, wires and like materials, the combination of a follower displaced in accordance with variation in the tension of the material, a source of current supply, two electric control circuits connected to said supply source, means whereby the control circuits respectively determine the increase and decrease in the rate at which the material is taken up relatively to the rate of supply, a rotary distributor, means whereby the distributor is driven at a predetermined speed, two contact segments spaced apart on the distributor in a direction parallel to the axis of rotation thereof, means connecting the two contact segments to the two control circuits respectively, a movable contact brush connected to the said source and means whereby the contact brush is moved over said distributor by the follower, the contact brush, as it moves from a normal or central position on the distributor, making contact with the appropriate segment at a predetermined periodicity, the duration of each contact period increasing as the brush moves away from the said normal position.

5. In apparatus for controlling the winding of webs, cords, wires and like materials, in combination, means for taking up and supplying the material, a source of current supply, an electric control circuit energised from said supply source, means whereby the electric control circuit regulates the rate at which the material is taken up relatively to the rate at which it is supplied, a follower displaced in accordance with variations in the tension of the material, a rotary contact device, means whereby the rotary contact device is driven at a predetermined speed, said rotary contact device including a movable contact member under the control of said follower, and means whereby the rotary contact device intermittently interrupts the energisation of the control circuit and thereby causes impulses to flow therein for regulating the means for controlling the rate at which the material is taken up relatively to the rate at which it is supplied.

6. In apparatus for controlling the winding of webs, cords, wires and like materials, in combination, a source of current supply, apparatus for supplying and taking up the material, an electronic valve connected to the supply source, apparatus for regulating the rate at which the material is taken up relatively to the rate at which it is supplied, means whereby the output of the valve controls the said regulating apparatus, a follower displaced in accordance with variations in the tension of the material, a make-and-break device controlled by said follower, and means connecting the said make-and-break device to the grid circuit of the valve, the impulses initiated by the make-and-break device thus effecting grid control of the valve, displacement of the follower causing adjustment of the make-and-break device and thereby varying the timing of each impulse applied to the grid circuit of the valve, relatively to the voltage cycle of the valve anode, in accordance with the amount of the said displacement.

7. In apparatus for controlling the winding of webs, cords, wires and like materials, in combination, apparatus for supplying and taking up the material, a source of current supply, an electronic valve connected to said supply source, apparatus for regulating the rate at which the material is taken up relatively to the rate at which it is supplied, means whereby the output of the valve controls said regulating apparatus, a follower displaced in accordance with variation in the tension of the material, a rotary distributor having a contact segment thereon, means whereby the distributor is driven at a predetermined speed, two brushes bearing upon said distributor, electrical connecting means between said brushes and the grid circuit of the valve, and means whereby the brushes are moved over said distributor by the follower, the impulses thus applied to the grid circuit of the valve effecting grid control of the valve, displacement of the follower causing the duration of each impulse to be varied in accordance with the amount of the said displacement.

8. In apparatus for controlling the winding of webs, cords, wires and like materials, in combination, means for taking up and supplying the material, a source of current supply, an electronic valve amplifier connected to said supply source, apparatus for regulating the rate at which the material is taken up relatively to the rate at which it is supplied, means whereby the output from the amplifier is applied to said regulating apparatus, a follower displaced in accordance with variations in the tension of the material, a make-and-break device, means whereby the make-and-break device is driven at a predetermined speed, said make-and-break device comprising a rotary contact member having at least one contact segment thereon, at least two brushes connected to the grid circuit of the valve amplifier, said brushes bearing against the make-and-break device, and means whereby movement of the follower causes movement of the brush contacts relatively to the rotary contact member thus varying the duration of each contact period, the electrical impulses thus effecting grid control of the valve amplifier which regulates the tension of the material, the duration of each impulse applied to the amplifier increasing with the amount of displacement of the follower from a normal or central position.

9. In apparatus for controlling the winding of webs, cords, wires and like materials, in combination, means for taking up and supplying the material, a source of current supply, an electronic valve amplifier energised from said source, apparatus for regulating the rate at which the material is taken up relatively to the rate at which it is supplied, the output from the valve amplifier controlling the said regulating apparatus, a follower displaced in accordance with variations in the tension of the material, an electric make-and-break device comprising an angularly adjustable carrier, at least one pair of contacts mounted on the carrier and connected to the grid circuit of the valve amplifier, a cam driven at a predetermined speed about an axis coaxial with the carrier and operating said contacts, and means whereby movement of the follower effects angular adjustment of the carrier relatively to the cam about the said axis thus varying the timing of the operation of the said contacts, the electrical impulses thus applied to the grid circuit of the amplifier causing grid control thereof, the timing of the impulses relatively to the voltage cycle of the valve anode being in accordance with the amount of the displacement of the follower.

10. In apparatus for controlling the tension of a paper web for a rotary printing press, in combination, a web supply roll, a brake acting on the supply roll, electrical control means for regulating the brake, a movable jockey roller over which the web passes from the supply roll to the printing press, the position taken up by the jockey roller depending upon the tension of the web, a source of current supply, an electric control circuit energised from said source, means whereby the control circuit in turn controls said brake, an electric contacting device which intermittently energises the control circuit at a predetermined periodicity, and means whereby the time characteristics of the impulses initiated in the control circuit by the contacting device are determined by the follower.

11. In apparatus for controlling the tension of a paper web for a rotary printing press, in combination, a web supply roll, an electrically controlled brake acting on the supply roll, a source of current supply, a jockey roller around which the web passes, the position taken up by the jockey roller being dependent upon the tension of the web, a rotary distributor, means whereby the distributor is driven at a predetermined speed, said distributor comprising two contact segments, a movable contact brush bearing on said distributor and connected to said source of supply, mechanism connecting the movable contact brush and the jockey roller whereby the movable contact brush is moved over the distributor in accordance with the movements of the jockey roller, two electric control circuits connected to the source of supply and to the two segments of the distributor, a rheostat controlling the energisation of the brake, reversible apparatus operating said rheostat, and means whereby the said reversible apparatus is operated in one direction or the other by energisation of one or other of the two control circuits, movement of the movable brush into contact with one or other of the distributor segments causing energisation of the appropriate control circuit by electric impulses applied at a predetermined frequency, the duration of each impulse increasing as the movable brush is displaced from a normal or central position.

12. In apparatus for controlling the tension of a paper web for a rotary printing press, in combination, a web supply roll, an electrically controlled brake acting on the supply roll, a source of current supply, a jockey roller over which the web passes from the supply roll to the printing press, the position taken up by the jockey roller depending upon the web tension, an electronic valve amplifier energised from said supply source, the output of said amplifier controlling the brake, a rotary distributor comprising a contact segment and an insulating segment, a motor for driving the distributor and connected to the said source, two contact brushes bearing upon the distributor, mechanism connecting the jockey roller and the brushes for moving the latter over the distributor in accordance with the movement of the jockey roller, a restraining resistance through which the grid circuit of the valve amplifier is energised, and electrical connections between the two brushes and said grid circuit, the point in the half cycle at which the restraining negative bias applied through the restraining resistance to the grid of the valve amplifier is removed by short-circuiting of the contact brushes by the distributor varying in accordance with the displacement of the follower from a normal or central position.

13. In apparatus for controlling the tension of a paper web for a rotary printing press, in combination, a web supply roll, an electrically controlled brake acting on the web supply roll, a jockey roller over which the web passes from the supply roll to the press, the position taken up by the jockey roller depending upon the web tension, a source of current supply, an electronic valve amplifier connected to said source of supply, the output of the amplifier controlling said brake, a restraining resistance through which the grid of the valve is energised, an angularly adjustable carrier, means whereby the carrier is angularly adjusted by movement of the follower in accordance with variations in the tension of the web, at least two cooperating contacts mounted on the carrier, said contacts being connected to the grid circuit of the valve amplifier, a rotary cam for intermittently closing and opening said contacts, and a motor connected to said supply source and driving the cam about an axis coaxial with the carrier, angular adjustment of the carrier by movement of the follower causing variation in the timing of the operation of the contacts by the cam, the contacts thus intermittently short-circuiting the restraining resistance in the grid circuit of the valve, the timing of each impulse thus applied to the amplifier, relatively to the voltage cycle of the valve anode, varying in accordance with the amount of the displacement of the follower.

EDWARD DOUGLAS KASSELL.
JAMES WILLIAM WILKINSON WALTON.